US007258882B2

(12) United States Patent
Hankinson et al.

(10) Patent No.: US 7,258,882 B2
(45) Date of Patent: Aug. 21, 2007

(54) SYSTEM FOR MAINTAINING FRESH QUALITY AND SAFE FOOD ATTRIBUTES OF MINIMALLY PROCESSED PRODUCE

(75) Inventors: Thomas R. Hankinson, 11 Checkerberry La., Framingham, MA (US) 01702; Lisa A. Herickhoff, Fort Collins, CO (US)

(73) Assignee: Thomas R. Hankinson, Framingham, MA (US)

( * ) Notice: Subject to any disclaimer, the term of this patent is extended or adjusted under 35 U.S.C. 154(b) by 536 days.

(21) Appl. No.: 10/383,278

(22) Filed: Mar. 7, 2003

(65) Prior Publication Data

US 2003/0198716 A1 Oct. 23, 2003

Related U.S. Application Data

(60) Provisional application No. 60/362,783, filed on Mar. 7, 2002.

(51) Int. Cl.
*A23B 7/015* (2006.01)
(52) U.S. Cl. .................. 426/234; 426/248; 426/270; 426/326
(58) Field of Classification Search ............... 426/102, 426/106, 125, 234, 237, 248, 262, 270, 326
See application file for complete search history.

(56) References Cited

U.S. PATENT DOCUMENTS

| | | | | |
|---|---|---|---|---|
| 2,248,618 A | 7/1941 | Fischer | ............... | 250/52 |
| 3,447,544 A * | 6/1969 | Lopez de Vergara | ......... | 134/60 |
| 3,718,482 A | 2/1973 | Hinkley | ............... | 99/150 |
| 4,011,348 A | 3/1977 | Farrier et al. | ............... | 426/268 |
| 4,066,795 A | 1/1978 | Dave | ............... | 426/259 |
| 4,121,107 A | 10/1978 | Bachmann | ............... | 250/455 |
| 4,140,649 A * | 2/1979 | Bossert et al. | ............... | 426/286 |
| 4,156,652 A | 5/1979 | Wiest | ............... | 250/527 |
| 4,189,850 A | 2/1980 | Dieterich et al. | ............... | 34/58 |
| 4,198,903 A | 4/1980 | Turatti | ............... | 99/642 |
| 4,601,080 A | 7/1986 | Cook | ............... | 15/3.12 |
| 4,730,719 A | 3/1988 | Brown et al. | ............... | 198/387 |

(Continued)

FOREIGN PATENT DOCUMENTS

WO     WO 09/02572     3/1999

OTHER PUBLICATIONS

Code of Federal Regulations, Parts 170 to 199, revised Apr. 1999, p. 442.

(Continued)

*Primary Examiner*—Drew Becker
(74) *Attorney, Agent, or Firm*—Santangelo Law Offices, P.C.

(57) ABSTRACT

A system and method of maintaining the integrity of freshly harvested, or freshly cut fruits and vegetables. Specifically, the invention focuses on a distinct series of processes which confer a lower total microbial count, delay browning, improve general organoleptic properties, and decrease the amount of chemical contaminants on the exposed surfaces without the use of preservatives. Examples of such process may be applying a first produce integrity maintenance process, a second produce integrity maintenance process, application of an antibrowning agent to the produce by a produce antibrown agent applicator, exposing the produce to ultraviolet light by an ultraviolet light system, and applying an ozone treatment by an ozone treatment system.

59 Claims, 3 Drawing Sheets

U.S. PATENT DOCUMENTS

| | | | | |
|---|---|---|---|---|
| 4,814,192 | A | 3/1989 | Sapers et al. | 426/268 |
| 4,818,549 | A | 4/1989 | Steiner et al. | 426/267 |
| 4,871,559 | A * | 10/1989 | Dunn et al. | 426/248 |
| 4,959,483 | A | 9/1990 | Matsumura et al. | 549/315 |
| 5,055,313 | A | 10/1991 | Warren | 426/268 |
| 5,087,466 | A | 2/1992 | Coudrains et al. | 426/256 |
| 5,213,759 | A | 5/1993 | Castberg et al. | 422/24 |
| 5,316,778 | A | 5/1994 | Hougham | 426/324 |
| 5,364,645 | A | 11/1994 | Lagunas-Solar et al. | 426/248 |
| 5,403,602 | A | 4/1995 | Endico | 426/231 |
| 5,405,631 | A | 4/1995 | Rosenthal | 426/235 |
| 5,501,241 | A | 3/1996 | Jacobson | 134/95.2 |
| 5,783,242 | A | 7/1998 | Teague | 426/320 |
| 5,855,270 | A | 1/1999 | Throop et al. | 198/394 |
| 5,858,435 | A * | 1/1999 | Gallo | 426/320 |
| 5,918,610 | A | 7/1999 | Tate et al. | 134/60 |
| 5,919,507 | A | 7/1999 | Beelman et al. | 426/268 |
| 5,925,395 | A | 7/1999 | Chen | 426/321 |
| 6,132,629 | A | 10/2000 | Boley | 210/760 |
| 6,132,784 | A | 10/2000 | Brandt et al. | 426/248 |
| 6,139,890 | A | 10/2000 | Simpukas | 426/321 |
| 6,150,663 | A * | 11/2000 | Rosenthal | 250/435 |
| 6,162,477 | A | 12/2000 | Crisinel et al. | 426/256 |
| 6,165,526 | A | 12/2000 | Newman | 426/248 |
| 6,171,548 | B1 | 1/2001 | Rose et al. | 422/20 |
| 6,196,237 | B1 | 3/2001 | Brown et al. | 134/25.3 |
| 6,200,618 | B1 | 3/2001 | Smith et al. | 426/320 |
| 6,224,926 | B1 | 5/2001 | Wrolstad et al. | 426/262 |
| 6,262,038 | B1 | 7/2001 | Pierce et al. | 514/53 |
| 6,287,617 | B1 | 9/2001 | Bender et al. | 426/335 |
| 6,415,902 | B1 | 7/2002 | Vis et al. | 198/384 |
| 6,467,248 | B2 | 10/2002 | Brown | 56/327.1 |
| 6,481,117 | B2 | 11/2002 | Turatti | 34/164 |
| 6,485,769 | B2 | 11/2002 | Audy et al. | 426/320 |
| 6,500,476 | B1 | 12/2002 | Martin et al. | 426/262 |
| 6,510,785 | B1 | 1/2003 | Margolin | 99/495 |
| 6,514,349 | B1 * | 2/2003 | Meldrum | 134/1 |
| 6,514,459 | B1 | 2/2003 | Crisinel et al. | 422/31 |
| 6,537,600 | B1 * | 3/2003 | Meldrum | 426/102 |
| 7,048,956 | B2 * | 5/2006 | Beelman et al. | 426/268 |

OTHER PUBLICATIONS

Federal Register vol. 66, No. 123 Jun. 26, 2001 Rules and Regulations p. 33829-30.

Jay, J. Modern Food Microbiology (fifth edition) Aspen Publishers; Gaithersburg, Maryland.

Kahn, V. et al, "Effect of Kojic Acid on the Oxidation of N-Acetyldopamine by Mushroom Tyrosinase", http://pubs.acs.org/isubscribe/journals/jafcau/jtext.cgi?jafcau/45/11/html/jf9702858.html, printed Aug. 4, 1998, 10 pages.

Lee, C. and Whitaker, J., "Enzymatic Browning and Its Prevention", ACS Symposium Series 600, American Chemical Society, Washington, DC, 1995.

PMP Fermentation Products, Inc., 500 Park Boulevard, Suite 450, Itasca, II 60142, "Fruits and Vegetables: Sodium Erythorbate", date n.a.

Rice, R. G. et al. "Recent Ozone Applications in Food Processing and Sanitation", reproduced from Food Safety Magazine, Oct./Nov. 2002.

Sapers, G. et al, "Enzymatic Browning Control in Minimally Processed Mushrooms", Journal of Food Science, V. 59, No. 5, 1994 p. 1042-1047.

Saper, G.M. et al, "Shelf-Life Extension of Fresh Mushrooms (*Agaricus bisporous*) By Application of Hydrogen Peroxide and Browning Inhibitors", JFS: Sesory and Nutritive Qualities of Food, vol. 66, No. 2, p. 362-366, 2001.

United States Patent Application Publication No. US 2002/0094363 A1 "Sanitizing Food Products" filed Jan. 18, 2001.

U.S. Appl. No. 60/362,783, filed Mar. 7, 2003 "A Method of Maintaining the Integrity of Mushrooms", 14 pages and 4 drawings.

Wiley, Robert, ed. "Minimally Processed Refrigerated Fruits and Vegetables", Chapman & Hall, p. 101-105, 1994.

* cited by examiner

SYSTEM FOR MAINTAINING FRESH QUALITY AND SAFE FOOD ATTRIBUTES OF MINIMALLY PROCESSED PRODUCE

This application claims the benefit of U.S. Provisional Application No. 60/362,783, filed Mar. 7, 2002, herein incorporated by reference.

I. BACKGROUND

Generally this invention relates to a system and method of maintaining the integrity of freshly harvested, or freshly cut fruits and vegetables. Specifically, the invention focuses on a distinct series of treatments which confer a lower total microbial count, delay browning, improve general organoleptic properties, and decrease the amount of chemical contaminants on the exposed surfaces without the use of preservatives.

The desire to retain the freshly harvested attributes of produce has been known by the produce, food safety, grocery and canning industries for several decades. Many types of produce, especially that having white flesh, begin to brown shortly after the fruit or vegetable is cut. In mushrooms in particular, the flesh browns as the produce ages, regardless of its having been cut. There are other distinct signs of aging including tissue breakdown (which induces more browning), microbial decay and the like. The desire to maintain freshly picked attributes is important both in the industries where the produce is consumed fresh (within weeks of harvest) and within industries where the produce is to be further processed.

Mushrooms are grown under conditions such that picked mushrooms contain much surface dirt. Moreover, growing conditions and hand-harvesting of mushrooms provides many opportunities for inoculation with spoilage organisms and human pathogens. Mushroom processors are prohibited from mechanically handling and processing mushrooms because of the propensity of mushroom tissue to bruise and subsequently brown. This attribute lowers the commercial appeal and nutritional value of the mushrooms.

Retention of fresh attributes desire has been an acute need within the mushroom industry where rapid browning, and product deterioration severely limits commercial potential and affects production. Browning and product deterioration are biological phenomena governed by enzymatic processes and cellular degradation. The rate of degradation is influenced by several factors including variety, innate levels of browning enzyme, storage temperature, growing conditions, harvesting conditions, bacterial levels, handling protocols and water exposure.

A primary concept for delaying enzymatic browning is the use of chemical compounds to quell effects of the browning enzyme either by inhibiting the enzyme, preventing formation of crucial intermediates, or by excluding or removing substrates of browning enzyme. In the past, many in the produce industry, and mushroom industry, used a solution of chemical preservatives including sodium metabisulfite. Mushrooms were washed with sodium metabisulfite until such treatment was deemed inappropriate for use by the FDA on products to be consumed fresh, as described in a book edited by Lee and Whitaker (1995). A second popular chemical for delaying or slowing browning of produce include treatment with various concentrations of sodium erythorbate and its stereoisomer ascorbic acid Under 21 C.F.R. §§ 170.3 and 182.3041, this ingredient is approved for use on foods by the FDA as a chemical preservative and is GRAS (Generally Recognized As Safe). If a non-detectable amount of chemical remains on the produce after processing then the chemical preservative is reclassified as a processing aid, and does not require inclusion on the ingredients list. The use of sodium erythorbate, alone or in combination with a few other chemicals, was discussed in a U.S. Pat. No. 4,814,192 by Sapers, et al., U.S. Pat. No. 5,919,507 by Beelman, U.S. Pat. No. 4,011,348 by Farrier, et al., U.S. Pat. No. 5,925,395 by Chen, U.S. Pat. No. 5,055,313 by Warren, U.S. Pat. No. 4,818,549 by Steiner, et al., U.S. Pat. No. 6,139,890 by Simpukas, as well as various publications including Sapers, et al. (1990) in a book edited by Wiley (1994), a book edited by Lee and Whitaker (1994) and PMP Fermentation Products, Inc. brochure entitled "Fruit & Vegetables". Sodium erythorbate functions to control enzymatic browning by acting as a free radical scavenger and chelator, altering the redox potential of the system and/or acting as a reducing agent. There are many other chemicals, or combination of chemicals that can function in a similar capacity as found in 21 C.F.R. §§ 182-184.

In U.S. Pat. No. 5,919,507 by Beelman et al. may employ the concept of chemical compounds, especially sodium erythorbate, on mushrooms in combination with a highly basic solution (as an antimicrobial). Treatment with this combination may be too expensive for commercial implementation and the use of a highly basic solution may be quite dangerous if workers are not sufficiently skilled. If mushroom tissue is not sufficiently neutralized browning can be induced by this treatment due either to cellular damage, or subsequent susceptibility to microbial attack. U.S. Pat. No. 6,287,617 by Bender, et al. may also describe a method utilizing pH shock (a highly basic treatment) followed by a known bactericidal treatment. U.S. Pat. No. 6,262,038 by Pierce et al. may use surfactant and biocompatible fruit acids (acidic pH). These technologies may suffer from the same faults as Beelman et al. coupled with the possible issues surrounding use of non-GRAS, non-process-aid bactericides.

A second method, similar to U.S. Pat. No. 5,919,507 by Beelman is described in U.S. Pat. No. 6,500,476 by Martin, et al. The Martin technology may employ a neutralizing step (acidic pH solution) after treating with basic pH, and prior to sodium erythorbate treatment. This technology requires storage and handling of dangerous chemicals, and may be fraught with disposal and environmental issues associated with acidic and basic solutions including as death of beneficial bacterial in leech field and/or settling ponds. In addition, there is potential for microorganisms on mushrooms to become tolerant to such chemical technology.

Another method which employs sodium erythorbate in combination with hydrogen peroxide as an antimicrobial for treatment on mushrooms is outlined in "Enzymatic Browning Control in Minimally Processed Mushrooms", Sapers, et al. 1994, Journal of Food Science, V. 59, No. 5, 1994 p. 1042-1047 and "Shelf-Life Extension of Fresh Mushrooms (Agaricus bisporous) By Application of Hydrogen Peroxide and Browning Inhibitors", Sapers, et al. 2001, J F S: Sesory and Nutritive Qualities of Food, Vol. 66, No. 2, p. 362-366, 2001. This technique may also be expensive in commercial implementation and extremely dangerous for unskilled workers. In addition, hydrogen peroxide at concentrations sufficient to suppress spoilage can induce browning. Hydrogen peroxide is not currently approved by the FDA for use on produce.

An additional method which employs the use of kojic acid is described in "Effect of Kojic Acid on the Oxidation of N-Acetyldopamine by Mushroom Tyrosinase", Kahn, et al. 1999. Kojic acid is an inhibitor of browning not approved for use by FDA. There are a host of other such chemicals which may inhibit browning but are not approved for use on foods according to sections in 21 CFR.

Another method, described in U.S. Pat. No. 6,224,926 issued to Wrolstad et al. may use antibrowning/antioxidant compounds, specifically an L-cysteine and glutathione derivative, as isolated from pineapple juice, and pineapple processing plants. L-cysteine is commonly used in the produce industry as an antibrowning compound. This treatment alone could not wash mushrooms, or dirty produce.

Another concept for delaying enzymatic browning may be heat inactivation of the browning enzymes. It may not be desirable to heat produce that is to be consumed fresh as heat induces organoleptic changes making it less valuable commercially.

Food safety is an important consideration in all food industries including the produce industry where various spoilage pathogens are detrimental not only to the commercial appeal (organoleptic properties) of the product, but also to the health of the consumer. One example of a pathogen that negatively affects human consumers and is found on mushrooms and other produce is *Clostridium botulinum*. It is important to reduce the indigenous populations of bacteria and other pathogens to both decrease the risk of illness to the consumer and to increase the useful shelf life of the product.

Mushrooms are subject to visible degradation by various plant pathogens and spoilage organisms. At times, degradation by this cause does not manifest itself until after said mushroom has been harvested and packaged. In addition to affecting the solitary mushroom initially infected, all surrounding mushrooms can be affected and may render the entire package commercially useless. Moreover, excessive moisture on the surface or interstitial spaces of the mushroom can create a micro-environment that increases the susceptibility of the mushroom to microbial or pathogen decomposition.

One concept for reducing the microbial load of produce may be to treat with a highly basic or highly acidic solution. A highly basic treatment is discussed in U.S. Pat. No. 5,919,507 by Beelman and U.S. Pat. No. 6,500,476 by Martin. These treatments do reduce the level of bacteria, and perhaps other pathogens, but may not treat as well as some known antimicrobial treatments that do not work well on mushrooms. Further without proper neutralization, residual acidity can result in damaged tissue that is more susceptible to pathogenic degradation. Moreover, it is possible, and probable that microbes will become resistant to such treatment.

An additional concept for reducing the pathogens on mushrooms may be to treat with ultraviolet light. Ultraviolet light has been utilized for sterilization for over 60 years (see U.S. Pat. No. 2,248,618 by Fisher) and continues to provide a reliable source of surface sterilization. Ultraviolet light causes death to cells and microorganisms via photochemical changes in DNA and cellular proteins, as discussed in the 1998 Jay reference. UV light is commonly used to treat fruitcakes and related products prior to packaging. With limited exposure the ultraviolet light could not penetrate the surface of the produce and could not negatively affect its organoleptic properties, nor induce browning, but it would help to surface sterilize. Ultraviolet radiation may be used in the food industry to create aseptic packaging as described by U.S. Pat. No. 4,121,107 by Bachmann. U.S. Pat. No. 6,171,458 by Rose, et al. may describe use of UV plus ultrasound to sterilize food products, and inorganic products. U.S. Pat. No. 6,165,526 by Newman may describe the use to UV irradiation to decontaminate food in combination with heat and microwaves. This may not appropriate for fresh-cut foods. Ultraviolet radiation use on foodstuffs is also described in U.S. Pat. No. 5,364,645 by Lagunas-Solar, et al.

A further concept for decreasing the microbal load of produce may be to subject produce to ozone. Ozone, triatomic oxygen dissociates into a highly reactive monatomic oxygen. Monatomic oxygen readily oxidizes cellular components. Ozone disinfects through direct oxidation as well as through formation of hydroperoxide intermediates, also bactericidal. Ozone is the fourth most powerful oxidizing agent known with an oxidation potential of 2.07 millivolts (chlorine is 1.35 millivolts) and disinfects approximately 3,000 times faster than chlorine. Ozone delivered in an aqueous solution is 5000 times more toxic than in gas phase.

In addition to disinfections, ozone may be used to deodorize, and remove color. In addition to affecting biota, ozone is also reported to breakdown pesticides, herbicides, and other chemicals as used in the food industry as discussed in U.S. Pat. No. 6,200,618 by Smith et al. There are no known toxic residues or byproducts of ozone therefore disposal may be a mute issue. Moreover, because ozone may be generated on-site and at the time of use, there may be no storage of chemicals, or other potentially dangerous issues.

Ozone is approved as a food additive as found in 21 C.F.R. § 173 and is starting to be used as a technology in the fruit and vegetable industry. Art specific to food may be described in U.S. Pat. No. 6,485,769 by Audy, et al. where utilizing ozone in water may be coupled with mechanical tumbling. This may not appropriate to mushrooms and bruise-prone produce due to the mechanical damage that would be induced. U.S. Pat. No. 6,120,822 by Denvir, et al. may describe the use of an ozone gas in a humid, pressurized environment. Similarly, in PCT Pub. No. WO 90/02572 to Cammiss may describe a technology to disinfect storage rooms and packed produce using ozone gas. U.S. Pat. No. 5,783,242 to Teague may describe a technique for treating food with UV gaseous ozone, or ozone in liquid. Ozone gas alone could not remove the large particulates from the mushroom surface and does not address other organoleptic issues associated with aging mushrooms. U.S. Pat. No. 6,200,616 to Smith et al. and U.S. Pat. No. 5,403,602 to Endico may describe contacting food with an ozone containing wash liquor followed by addition of a surfactant. These technologies may not address physiological browning, nor is the period of immersion (minimum 2 minutes) suitable for mushrooms. Moreover, because this process may occur in one tank, all ozone could be reduced by gross contaminants present in the water after the first batch of mushrooms was washed, and may render ozone treatment ineffective. Similarly, U.S. Pat. No. 5,405,631 to Rosenthal and U.S. Pat. No. 6,132,784 to Brandt et al. utilize UV irradiation and ozone generation (by UV light) to treat fruit. U.S. Pat. No. 6,514,459 to Crisinel, et al. may have introduced a technology to utilize ozone in combination with dirt-removal via tank agitation. Mushrooms generally float however too much agitation can cause them to sink, and could result in water-logged mushrooms. Mushrooms with too much water may lose fresh-cut, organoleptic properties more quickly than unwashed mushrooms.

In addition to delaying browning, and microbial load reduction, there is a desire to rid the mushrooms of growing media for both aesthetic and cleanliness reasons. Mechanical means for reducing macro surface contaminants include, but are not limited to the use of an air knife or similar forced air treatment. As the surface of the mushroom appears to be slightly sticky, this method may not work well.

Mushrooms, and other fruits and vegetables may be treated with various chemicals (herbicides, pesticides, fertilizers, and the like) during growth. The popularity of organic produce underscores the public's perception of residual chemicals on food products. Removal of such could be beneficial to the sale of fruits and vegetables. Ozone may be the only food safe technology which has addressed this issue in an economic manner, as discussed in U.S. Pat. No. 6,200,616 to Smith.

Produce may be washed in either chlorinated water, also a widely used bactericide, or non-chlorinated (organic produce) water flume to remove external contaminants such as dirt. Generally such treatment may not serve to reduce the indigenous population of microbes, rather it may increase said population; however it can remove loose surface impurities. Extended treatment of this type may not be appropriate for mushrooms as excessive water is taken up by the mushroom and causes a surface imperfection called "window paneing". Window paneing may be commercially detrimental. At chlorine levels sufficient to reduce spoilage organism on mushroom surfaces, browning is induced due to non-enzymatic oxidation of indigenous substrates to form chemicals that serve as browning intermediates. This is noted in the book edited by Lee and Whitaker (1995).

Another concept for sanitizing the surface of fruits, and vegetables as well as other food products may be through the combined used of two or more of the aforementioned technologies. For example, UV and ozone are reported to work synergistically to sanitize exposed surface, and to whiten a product. U.S. Pat. No. 4,156,652 to Wiest may utilize the synergy of ozone and ultraviolet light to sterilize fluids. U.S. Pat. No. 5,213,759 to Castberg may describe the use of UV radiation in an atmosphere of ozone followed by hydrogen peroxide for sterilization of food packaging. Similarly, U.S. Pat. No. 6,162,477 to Crisinel, et al. may describe a process utilizing an aqueous chemical treatment followed by pressurized ozone injection into a tank of aqueous liquid. This process may be designed to be used primarily on fish and therefore may not address cleaning of macro debris, and residual sugars, that will decrease, or nullify the effectiveness of the first solution and/or ozone. This could be overcome by frequent refreshing of the tank; however, this would create inordinate expenses to the processor. The patent may not address removal of excess liquid on the surface of the food product which will affect the quality of the end product. Further, this technology may not exploit the synergy of other antimicrobial technologies with ozone treatment.

U.S. Pat. Pub. No. 20020094363 to Traeder, et al. may describe spraying a food product with ozone plus a surfactant followed by a preserving agent. Because the ozone may be used directly on a dirty, or freshly cut product, the ozone could not oxidize microbial products, but could instead be used to oxidize cellular materials and gross contaminants, thus minimizing, or eliminating its antimicrobial action. Further, a spray system alone likely could be insufficient to remove macro debris, especially on mushroom surface. Sufficient force to remove the dirt could likely result in surface bruising and subsequent browning. Moreover, because this art may suggest collecting, filtering and re-ozonating the wash solution, it is unlikely that ozone levels could be maintained at a sufficiently high levels. Filtration of liquid could not remove all contaminates such as cellular sugars, and organic load could build up in the water, and the ozone could be used to oxidize organic contaminants rather than microbes on the surface of produce.

As in the produce industry and the mushroom industry, the general public clamor for produce that maintains its integrity, its "freshly-picked" organoleptic properties over its shelf life, is treated in a manner safe for workers and consumers alike, and is economically feasible. The present invention discloses a system which overcomes virtually everyone of the aforementioned problems in a practical fashion. It provides a method to rid the produce and mushrooms of growing media, decrease the indigenous level of pathogens, decreases the amount of residual chemical on the surface, and inhibit or slow browning of the surface without inducing negative attributes, nor requiring disclosing of wash ingredients on the finished package.

II. SUMMARY OF THE INVENTION

Accordingly, the present invention includes a variety of aspects or embodiments which may be selected in different combinations to suit the needs of the user. First it can function as a treatment for whole mushrooms, or whole produce which is to remain whole and sold as fresh. Further, it can function as a treatment for whole mushrooms, or produce which are to be sliced and sold as fresh, sliced mushrooms or sectioned (fresh-cut) produce. Also, it can function as a treatment for previously sliced produce. In addition, it can function as a treatment for mushroom, or produce which is to ultimately be used for canning, or further processing, either whole or sliced, such that processing can wait until such time as it is practical to process a batch without having to address issues such as browning during holding time. Perhaps also, it can function as an aid to consolidate and coordinate picking, processing and packaging such that mushrooms, can be treated in large, economical batches rather than singular type treatment as is the current practice. It does so by increasing the practical shelf life thereby extending the time in which the mushrooms must reach the marketplace. Further, it can aid mechanization of the treatment and packaging of mushrooms which are currently packaged in a manual line. By inhibiting the browning enzyme from functioning, treatments which may normally cause bruising and subsequent browning now may only cause a surface deformation. Also, the present invention serves as a 'worker-safe' method such that inordinate training is not required for implementation of the various treatment steps, nor are dangerous chemicals stored in the vicinity of the worker. The invention may utilize GRAS ingredients that are not extremely caustic either in concentrated, or diluted form and methodologies for which 'easy-to-implement' safeguards already exist, and/or may utilize treatments for which the functioning element is generated on-site and on-demand. Also, the process helps to create a safer consumable by reducing the amount of residual chemical (pesticide, herbicide, fertilizer) on the surface of the produce. The invention may be also environmentally safe, as the amount of water utilized in the process is reduced in comparison to traditional wash processes due to the recycling step and the water is free from contaminants which will harm downstream biota.

This invention may relate to processing of fresh-cut produce, including but not limited to fruits and vegetables. Further the invention may relate to, but not limiting to, non-leafy produce, fungal items of produce, edible fungal items of produce, mushrooms or white button mushrooms. Non-leafy produce may include, but is not limited to root vegetable, tuber vegetable, bulb vegetables, flower vegetables, immature fruit vegetable, seed vegetable, simple fresh berry fruits, simple fresh hesperidium fruits, simple drupe fruits, simple pome fruits, multiple fleshy berry fruits, potato, artichoke, broccoli, pea pods, shelled peas, banana, citrus, peach, apple, and strawberry It is described in the context of the preparation of mushrooms but is believed to be useful on other fruits and vegetables, especially those that are subject to browning. The technology could be used on whole produce, whole produce to be sliced, or otherwise sectioned, or sections of produce.

One of broad objectives of the invention is to allow mushroom farms to retrofit current equipment such that capital expenditures for implementation are minimal. One goal of the present invention may include having flexibility in the process such that treatments can be applied in a variety of manners including dip tanks and spray methods (drenching, spraying or misting). Another goal may include defining the requirements for treatment such that parameters are well understood and can be achieve through retrofitting of common mushroom treatment equipment.

Another broad objective could be treatment in such a manner that mushrooms are not broken, or otherwise damaged during processing. A goal could be to ensure maximum care will be taken to design equipment requirements such that physical handling and manipulation of the mushrooms is minimized. A further goal is to minimize the number of different treatment steps utilizing different pieces of equipment.

Additionally, one broad objective of the invention may be to minimize the time mushrooms are exposed to solution to minimize water and chemical uptake by mushrooms. One goal may include maximum utilization of treatments that are not of an aqueous nature. Another goal may be to minimize residence time in solution and maximize effectiveness of the treatment solution.

Yet another broad objective of the invention may be to minimize the cost to the processor such that the invention is commercially practical. One goal may incorporate the preservation of expensive solutions such that they can be used for multiple treatments. Another goal may include the minimization of contamination of the expensive solution. A further goal may encompass the use of minimal amounts of the most expensive solutions. Also, a goal may espouse the recycling of natural resource such as water, to minimize disposal. Yet another goal may address the use of environmentally safe products, such that disposal of treated water may be accomplished without requiring special steps, or modification of current disposal systems, or additional disposal expenses.

Another broad objective of the invention may be the creation of a treatment which does not modify the chemical constituents of the mushroom, nor may there be any detectible level of chemical remaining after treatment therefore rendering the treatment as a processing aid, not requiring labeling on the final package. One goal may include the use of GRAS ingredients at the lowest possible concentration which still achieves a positive benefit.

Another broad objective of the invention may be to create a treatment which is applicable to a all commercially important mushroom species and varieties. As such, one goal may encompass the ability to treat mushrooms that do have open veils.

A further broad objective of the invention may be to render a final product which is a value-added product, having improved organoleptic properties and decreased risk of food-borne illness. One goal may encompass the use of technologies which effectively decrease human pathogens and decay related microbes on the surface of the produce. A further goal may be to efficiently minimize the impact of the enzymes and processes which induce browning.

IV. DETAILED DESCRIPTION OF THE PREFERRED EMBODIMENTS

The basic concepts of the present invention may be embodied in a variety of ways. It involves both treatment techniques, combinations of food grade chemicals, as well as equipment to accomplish the appropriate treatment. In this application, the treatment techniques and equipment are disclosed as part of the results shown to be achieved by the various devices described and as steps which are inherent to utilization. In addition, while some devices are disclosed, it would be understood that these not only accomplish certain methods but also can be varied in a number of ways. Importantly, as to all of the foregoing, all of these facts should be understood to be encompassed by this disclosure.

Figure 1:
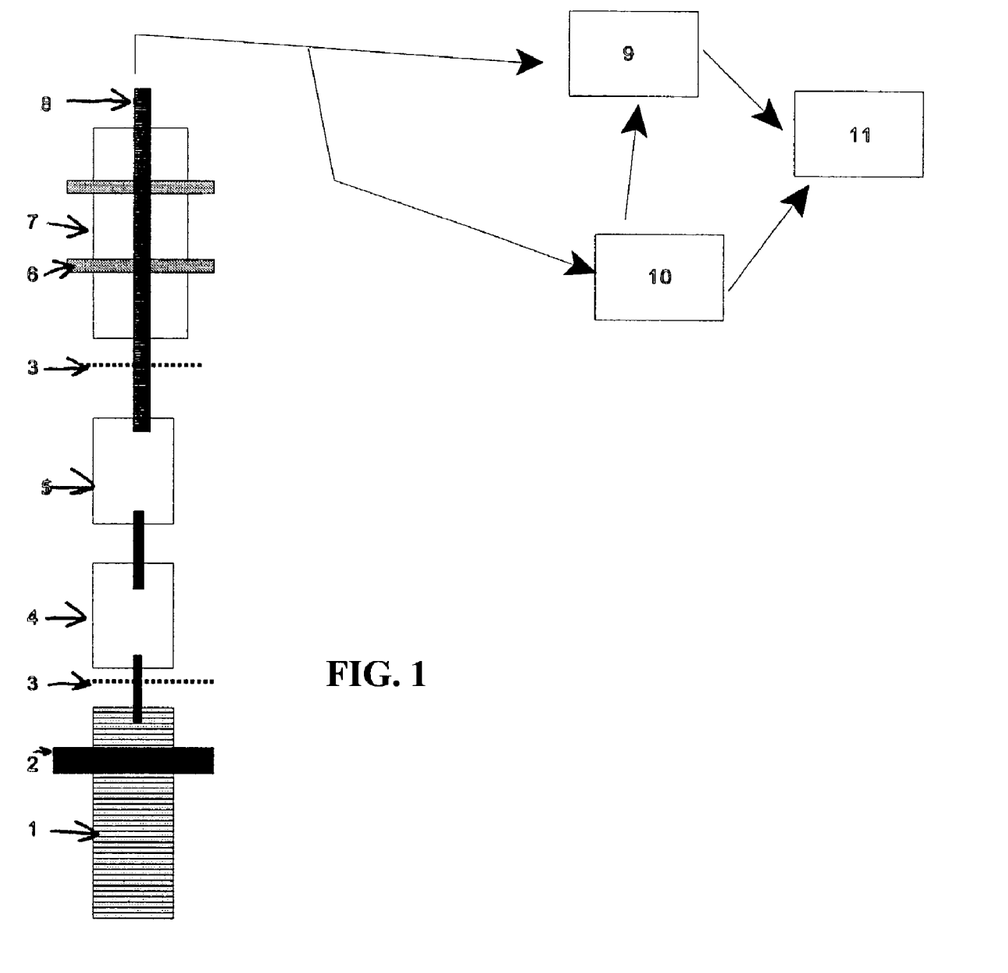
FIG. 1 is a block diagram illustrating the principal components of a wash-line which may be used to carry out the method of the present invention.
Figure 2:
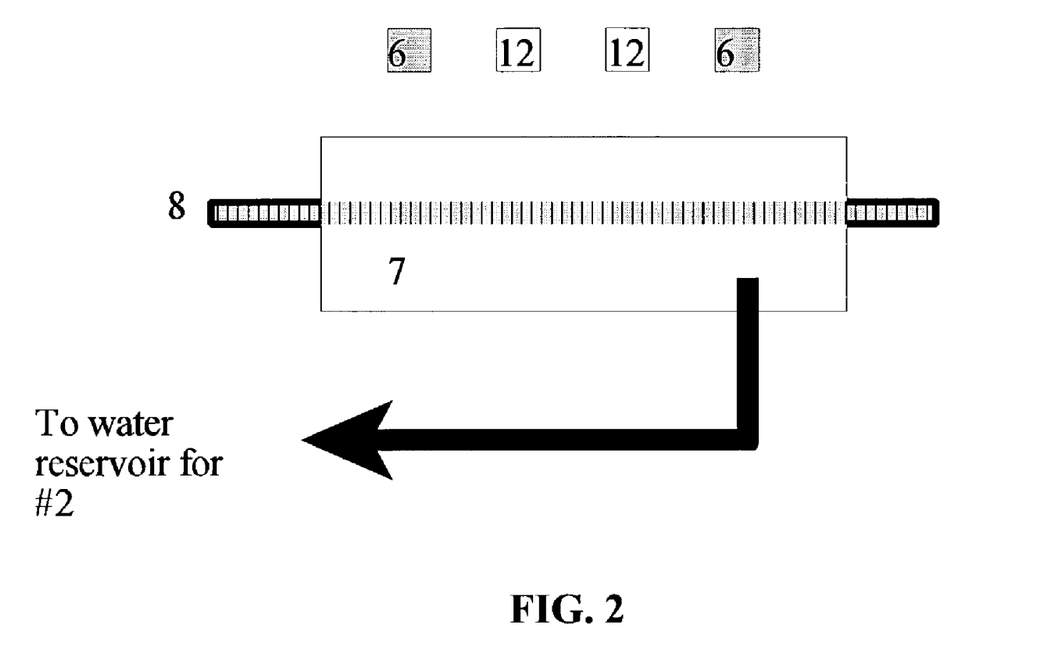
FIG. 2 is a block diagram illustrating the ozone/ultraviolet light treatment tank, side view.
Figure 3:
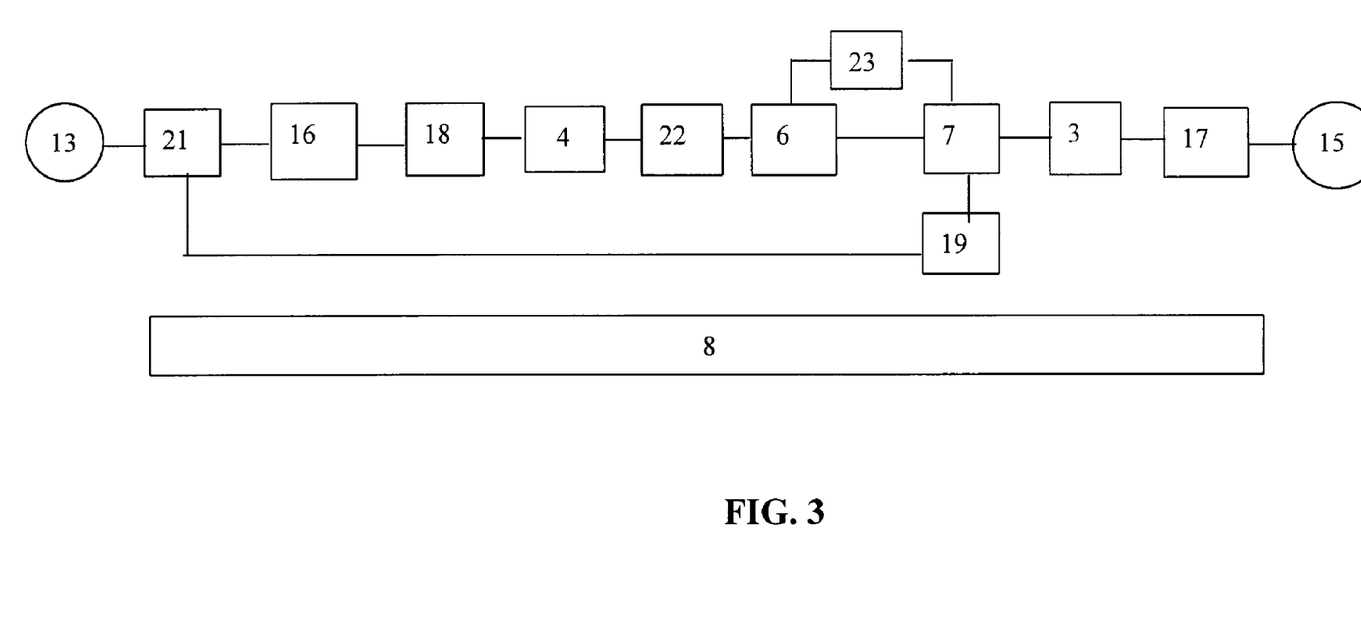
FIG. 3 is another block diagram illustrating some of the elements through one design of an embodiment.

FIG. 1 shows a block diagram illustrating the principal components of a wash-line which may be used to carry out the method of the present invention and FIG. 2 details the ozonation/ultraviolet treatment area. For both figures (1) indicates a slotted vibratory table or conveyor; (2) indicates a cleaning solution treatment; (3) a surface water removal system; (4) and (5) are antibrowning treatment tanks; (6) is an ultraviolet light process; (7) indicates an ozone treatment system and ozonated water collection tank; (8) indicates a conveyor; (9) indicates a slicer; (10) indicates a vacuum cooler; (11) indicates a packaging system; (12) indicates ozone treatment system.

In some embodiments of the present invention, a series of treatments and baths which may include a macro-cleansing step, an anti-browning step, and an antimicrobial step which will clean a mushroom such that it goes from freshly picked to having superior organoleptic properties and lower microbial load including human pathogens and mushroom decay organisms.

In the one embodiment, present invention may provide a method for accepting input of at least one item of produce, making an input capability for produce, or a non-damaging produce input (13). The macrodebris including, but not limited to physical particulates and gross contaminants such as large pieces of soil, or broken or fractured mushroom parts may be sorted from whole mushrooms by a macrodebris removal system (21) or by collecting them on an oscillating, or vibratory table (1) which may have slots or apertures through which gross contaminants can pass but over which whole mushrooms may be transported. A method to remove these macrodebris may be treating a produce in conjunction with a sieve-type element. To those skilled in the art, there are any variety of alternatives to accomplish this task. At the end of the table, or immediately following physical vibrating, the mushrooms may be conveyed or pass into or under, at least one process. The present invention may provide for a transport capability where at least one produce may be carried or moved through at least one process. Examples of such process may be applying a first produce integrity maintenance process, a second produce integrity maintenance process, application of an antibrowning agent to the produce by a produce antibrown agent applicator (4,5) exposing the produce to ultraviolet light by an ultraviolet light system, and applying an ozone treatment (7) by an ozone treatment system. In one embodiment, the present invention may provide for a non-damaging produce output (15) so that the produce may not be bruised or damaged. A produce conveyor (8) may be positioned at least partly in a processing path between the non-damaging produce input and the non-damaging output.

In one embodiment, the cleaning solution (2) may be a pH neutral, for example about pH 6.5 to 7.5, aqueous solution that may or may not include a surfactant to aid in the removal of visible and invisible contaminants. The surfactant used may be any surfactant used in the industry. The cleaning solution may also contain an anti-foaming agent to suppress dirt and excess proteins coupled with agitation, from creating an excessive mess, and to ensure adequate treatment of the mushrooms with the solution. Anti-foam could be a food grade agent and may be at a concentration at, or around, 5 ppm. The cleaning solution (2) may be applied for a period of time not to exceed 15 seconds, for example, less than four seconds and can be applied as either a spray, mist, drench or as an immersion bath treatment. In the preferred embodiment, the cleaning solution may be applied as a spray using about two to three spray bars positioned about 3 to about 7 inches above the conveyor surface.

In embodiments, the cleaning solution (2) may be recirculated such as through a recirculator (19) and may be filtered to remove large contaminants as well as passed through a fine filter to remove microscopic contaminants before being re-utilized for further rinsing or disposed of down a drain.

In embodiments, the cleaning solution (2) may be applied such that all surfaces of the mushroom are exposed equally and for an equal period of time or the treatment may also be applied preferentially to certain surfaces which are less sensitive to water-uptake. Produce may have a plurality of surfaces and each may have a different predominant directional orientation. The produce or mushroom may be repositioned during the cleaning solution process to facilitate equal application. The treatment may be followed by removal of excess water on the surface of the mushroom by a commercially available air knife or other such forced air treatment. The removal of excess water, after any process step, not only the cleaning solution, may include affirmatively drying the produce wherein a process or drying element is used to expedite the drying. After affirmatively drying the produce, the produce may be then in a relatively dry state where the produce may have a small amount of water remaining on it. For example, removing at least about 80% of surface water from a produce or perhaps even removing at least about 90% to 95% of surface water from a produce.

In one embodiment, the aqueous portion of the cleaning solution step may be recovered and transported via standard food industry art, to a holding reservoir. The cleaning solution step may be, but is not limited to be, the first step in the wash process, which may increase the efficacy of each of the following, more expensive steps by avoiding contamination of those wash or spray tanks.

In some embodiments, the cleaning step may or may not be followed by surface water removal system (3). The length of time, and/or the length of conveyor, to the next treatment may impact the need for a drying step post the cleaning step. If the length of time is greater than 5 seconds, such a drying step may be desirable.

In embodiments, the antibrowning agent (4,5) may be a solution which is maintained at a pH at or near that of the pH of produce or mushroom tissue. For example, the pH of the antibrowning agent solution may be in the range of about pH 5.5 to about 7.5. Further, the pH of the antibrowning agent solution may be at the physiological pH of mushrooms, which may be about pH 6.5, or at the physiological pH of the tissue of the produce being treated. Additionally, an antibrowning agent solution may comprise about 2.0% to 4.5% (w/v) of sodium erythorbate. Also, an antibrowning agent solution may comprises about 3.0% to about 3.5% (w/v) of sodium erythorbate at a temperature of about 34 to about 50 degrees F. The antibrowning solution may contain a chelator to remove divalent cations from the solution which may render the sodium erythorbate more effective. This chelator may be disodium EDTA at about 0.1 to about 0.4% (w/v) in solution. The solution may also contain calcium chloride, or any other chemical known to those skilled in the art, to stabilize plant cell walls, at a concentration of about 0.1 to about 0.4% (w/v). Further, the solution may comprise ascorbic acid and/or sodium chloride in various concentrations. The solution may contain, in addition, or as substitution, any other GRAS substance which is known, to those skilled in the art, to inhibit browning, including, but not limited to citric acid, and cysteine-HCL. Any of these may be involve the use of an additional substance applicator (18) that may be specified as to the particular substance involved.

In some embodiments, the antibrowning solution may be applied for less than about 1.5 minutes, for example less than about 30 seconds, but more than about 2 seconds. The antibrowning agent solution may be applied as either a spray, mist, drench or as a total immersion treatment. The application may occur in single step, or in multiple, sequential steps and using a variety of application techniques.

In one embodiment, the antibrowning agent treatment (4,5) may be followed by a water rinse such as through a water rinse system (22) to ensure abatement of chemical residual on the produce surface. Such water rinse may be immediately preceded by surface liquid removal. Such water removal treatment may also immediately follow a fresh water rinse step.

In embodiments, the antibrowning solution may be applied such that all surfaces of the mushroom are exposed equally and for an equal period of time or the treatment may also be applied preferentially to certain surfaces which contain a greater concentration of browning enzyme. The produce or mushroom may be repositioned during the antibrowning solution process to facilitate equal application.

In some embodiments, the antibrowning agent step may or may not be followed by surface water removal system (3). The length of time, and/or the length of conveyor, to the next treatment may impact the need for a drying step post the cleaning step. If the length of time is greater than 5 seconds, such a drying step may be desirable.

The present invention may provide for an antimicrobial/anti-pathogen treatment. The antimicrobial/anti-pathogen treatment may consist of either treatment with simultaneous or sequential application of ozonated water by an ozone treatment system (7) and ultraviolet light by an ultraviolet light system (6) as may be effected by a simultaneous produce treatment control system (23). Both of these treatments may be generated using commercially available apparatuses that can be adapted to a conveyor, shaker table or aqueous application equipment. For example, the ozone generation machine will be a corona discharge ozone generator, such as the Ozonice by Boley and Associate, covered by Boley U.S. Pat. No. 6,132,629, utilized in the disclosed experiments.

The present invention may provide for substantially simultaneously subjecting a produce to at least a portion of a first produce integrity maintenance processes and at least a portion of a second produce integrity maintenance process. In one embodiment, the substantially subjecting may include a first process overlapping at least part of a second process. In one embodiment, the substantially subjecting may include a first process overlapping a majority of a second process. In one embodiment, the substantially subjecting may include a first process overlapping nearly all of a second process. In one embodiment, the substantially subjecting may include a first process completely overlapping a second process.

If a process or treatment is sequential, the order of treatment may be reflected in many permutations, including, but not limited to: (U.V., ozone), (U.V., ozone, U.V.), (U.V. ozone, ozone U.V.), (ozone, U.V.). Statement of these permutations is not intended to be limiting. Alternatively, treatment may be simultaneous, and followed by a second exposure to ultraviolet light, or multiple treatments of any of the process described herein. Further, the process may include a first ozone treatment, a second ozone treatment, multiple ultraviolet light systems, or a second ultraviolet light.

This treatment may maintain integrity of the produce to at least some degree by exerting sufficient ultraviolet light and ozone to reduce the indigenous population of human pathogens or microbial decay organisms on the mushroom surfaces while refraining from damaging the mushroom tissue. Such application rate may be about 0.5 to about 5 ppm ozone (in water) at a temperature not to exceed about 60 degrees F. but preferably at or below about 40 degrees F., and a pH between about 6 and about 8, for example at, or around pH 6.5, or the physiological pH of the produce being treated. Ozone treatment application rates shall be limited by current FDA/USDA regulations for ozone treatment application on food products, as well as efficacy. Ozone may be in aqueous solution and may be applied as a dip, spray or drench solution, most preferably as a spray solution.

The total exposure time for the antimicrobial/anti-pathogen treatment may be between about 5 and 60 seconds, for example about 20 seconds. In the preferred embodiment this solution may be applied such that all surfaces of the mushroom are exposed equally and for an equal period of time or the treatment may also be applied preferentially to certain surfaces which are less sensitive to water-uptake. The produce or mushroom may be repositioned during the ozone treatment (7) process to facilitate equal application.

The ultraviolet light (6) may be comprised of at least three wavelengths, for example, 185 nm, 189 nm, and 253.7 nm from a standard ultraviolet source. The ultraviolet light may be positioned at a distance of about 1 to about 24 inches from the exposed surface of produce. In one embodiment, a dose of 0.1 joules/cm$^2$ may be considered effective, as is known to those skilled in the art. The dose of ultraviolet light may be achieved by using either individually or in combination of different wattage bulbs with varied distance to the product, and varied time of exposure, or the like in any combination therein. In one embodiment, a dose of ultraviolet light may be used to determine the optimal distance from the surface of the mushroom to the U.V. light source, and will be effected by the height of the mushroom relative to the conveyor, et cetera. Low-pressure, commonly available ultraviolet bulbs emitting a broad germicidal spectrum may be used and may be used with at least three wavelengths. In some embodiments, bulbs having single, or short spectra can be used such that the appropriate wavelength is utilized at the appropriate place. For example, wavelength of 180-200 nm may be used simultaneous with ozone treatment, while a bulb having 253.7 nm wavelength may be used immediately following ozone treatment. This application may treat all surfaces of the mushroom and the mushroom may be gently rotated during the exposure to ozone or ultraviolet light by technologies common in the food industry, or particular surfaces will be treated preferentially. Moreover, one surface may be treated by ozone, and ultraviolet light while another surface might be treated only by ultraviolet light. Both ultraviolet light and ozone treatments are commonly used to treat various, organic and inorganic materials in order to decrease the bacterial contamination on the exposed surfaces of said material.

In some embodiments, the antimicrobial/anti-pathogen treatment may be placed immediately following the initial water wash treatment, or immediately following treatment with the antibrowning solution. It may also occur at multiple steps during the treatment.

In one embodiment, the antimicrobial/anti-pathogen treatment would occur such that the mushrooms are free from macro contaminants such as casing materials. This enables the full functionality of the ozone/ultraviolet treatment.

In the preferred embodiment the aqueous solution from the antimicrobial/antipathogen treatment could be collected immediately following treatment, and transferred to a reservoir to be used in the cleansing step.

In one embodiment, the antimicrobial/antipathogen treatment might occur in more than one place in the production line thus ensuring microbial cleanliness. The last step in the production wash line may be an antimicrobial/antipathogen treatment.

In some embodiments, the antimicrobial/antipathogen treatment may or may not be followed by surface water removal system (3). The length of time, and/or the length of conveyor, to the next treatment may impact the need for a drying step post the cleaning step. If the length of time is greater than about 5 seconds, such a drying step may be desirable.

In embodiments, the present invention may provide for rapidly treating a produce by an overall treatment modality. In one embodiment, the total treatment or overall treatment modality, may include the cleansing step, the antibrowning step, the antimicrobial/antipathogen step, and transfer between processing tank likely may not exceed about 3 minutes in duration. For example, the total treatment may be less than about 2 minutes in duration. The total treatment time may exclude the slicing and/or vacuum cooling and/or packaging steps. Total time of exposure of produce to a liquid may be between about 8 and about 165 seconds.

In one embodiment, the processing room may be temperature controlled such that it ranges between about 34 degrees F. and about 65 degrees F. Moreover, all solutions can be applied at a temperature of about 34 to about 50 degrees F. For example the solutions temperature may be about 35 to about 40 degrees F. The temperature of a produce, for example mushroom pulp, may remain at, or around about 38 degrees F., but not more than about 50 degrees F. Such temperature control may perhaps help ensure that all mushroom metabolic activity is slowed and microbial activity minimized.

In some embodiments, the steps of treatment may be applied in a number of different orders depending on the variety of the produce, such as a mushroom, the issues associated with the type of mushroom, the processors needs, or any other possible variation. FIGS. 1 and 2 may describe a few such varieties, and outline some options for application at each step. The figures are not intended to be fully inclusive of all options for application, or application order.

In order to effectively treat specific surfaces, produce, for example, mushrooms might be oriented using a orientation element (16) or using technology such as described by U.S. Pat. No. 6,415,902 to Vis et al., U.S. Pat. No. 4,730,719 to Brown et al., U.S. Pat. No. 4,198,903 to Turatti and U.S. Pat. No. 5,855,270 to Throop et al. A produce may have a plurality of surfaces and each may have a different predominant directional orientation. The present invention may provide for differential treatment of the plurality of surfaces of a produce. The invention may provide orienting a produce in a substantially preferred manner and directionally subjecting at least part of the plurality of surfaces to at least one process. These technologies, among others, may enable each process step to be applied preferentially to a produce, for example, a single surface of the mushroom, for example, the cap, without wetting other surfaces. In one embodiment, orientating a produce may enable treatment of a single surface with more, or less solution than other surfaces. For example at least part of a produce may be treated for about 1 second while at least another part of a produce surface may be treated for 4 seconds using the same solution. This multi-surface, multi-treatment may occur simultaneously, or may occur sequentially. Contact with the specified surface might be via spray of a said surface, via blocking-off of specified surfaces and subsequent treatment of whole mushrooms, contacting of desired surface with a piece of material or other such device capable of absorbing liquid. In one embodiment, it might be appropriate to avoid the solution "running" onto untreated surfaces and the surface to be treated may be subject to 'up-side-down', or cap-side-down, stipe-up orientation.

Because excessive water uptake may be detrimental to quality of the finished product, steps should be taken to limit exposure to solutions during the wash process. Such steps may include, but not limit to, the use of an air knife, a vacuum or other means that are available to those skilled in the art. In the preferred embodiment, the drying process may not involve extra handling steps and may avoid technologies such as centrifugal drying. In the one embodiment, the drying process may remove at least about 80% of the surface liquid from the treated surface. For example, the drying process may remove between about 90% and about 95% of the surface liquid. In addition, although treatment might be limited to a single surface, exposure to an air knife, or similar method of liquid removal, might include the entire surface area. This may help to ensure that liquid sensitive surfaces, are not inordinately exposed to liquids. Further, treatment with a drying apparatus might be of different velocities, or air pressures (in the case of an air knife) on different surfaces to avoid damage to delicate tissues. The drying steps may be in between each treatment, or intermittent between treatments, and may preferentially occur after a last aqueous treatment, and before packaging, making available for distribution, or further processing. Drying between treatments may occur by any variety of known technologies, but should not inordinately slow the processing or washing line. In the preferred embodiment, it should be understood that a drying process or drying step can occur at ambient temperature, but may not rely on increased temperature for effectiveness. In the preferred embodiment, the liquid removed from the surface of the treated product may, or may not be collected in order to be re-used in the processing line.

In one embodiment, the technology utilized may be commonly available pieces of produce processing equipment used to achieve the same results. The produce processing equipment may have achieved a first overall treatment modality. The present invention may provide for the altering of produce processing equipment to achieve a second overall treatment modality. The present invention may provide altering the produce processing equipment to preferentially expose at least part of a produce. In this way, processors can utilize 'moth-balled' or otherwise used equipment to implement the technology without having to fabricate an entire processing line. For example, the ability to treat produce via spray, dip, drench or immersion, or any variety of combinations, may enable a processor to utilize a dip tank, and a spray conveyor, or a series of small dip tanks, and the like, to achieve the required processing time. Moreover, small modifications in equipment, e.g. adding a series of spray bars over a conveyor, may also allow processors to utilize current equipment without significant capital expenditures. The retrofitting of equipment may make this technology superior over technologies in which large capital expenditures for new, specialized equipment may be required because it is cost effective in an industry having very small margins.

In the preferred embodiment, in order to continue the effectiveness of this technology while the produce is transported to the end user, such washed product might be over-wrapped or covered by 'oxygen-scavenging film' that can absorb latent oxygen in the package, or that is metabolized by the fresh-cut product. This may include the use of an oxygen scavenging film applicator (17).

Having generally described this invention, a further understanding can be obtained by reference to certain specific examples which are provided herein for purposes of illustration only and are not intended to be limiting unless otherwise specified.

EXAMPLE 1

Mushrooms were either 1) untreated (unwashed), that is, left as picked; 2) sodium metabisulfite (sulfite treated) washed. Mushrooms were water rinsed with tap water for 2 seconds then processed through 2 consecutive dip tanks containing 500 ppm sodium metabisulfite in solution; or 3) Washed using the herein disclosed process (new wash) specifically as follows: Mushrooms were conveyed on a slotted conveyor belt and sprayed with tap water for 2 seconds. They dropped into a series of two dip tanks containing 3% (w/v) sodium erythorbate, 0.15% (w/v) disodium EDTA, 0.15% (w/v) calcium chloride. Total residence time was 30 seconds. The whole mushrooms were then treated by dipping in water containing 2 ppm ozone (15 second exposure) followed immediately by 10 second exposure to ultraviolet lamp. Half of the mushroom were sliced and again exposed to 10 seconds of ultraviolet lamp. The mushrooms were packaged and stored at either 35, 45 or 55 degrees Fahrenheit and analyzed microbiologically at day 0, 3, 6, and 9 for total aerobic plate count with a sensitivity of 1,000 cfu/gram, and day 3,6 and 9 for organoleptic properties including degree of whiteness, amount of veil opening, and overall salability/quality. Storage at 45 and 55 degrees Fahrenheit represent physiologically stressful conditions and will illustrate benefits of treatments to a greater extent than 35 degree F. storage.

For all examples, data was analyzed statistically using single factor ANOVA and Student's T-test preparing two groups and assuming equal variances. All data was analyzed at 95% confidence levels.

TABLE 1

Experiment 1 Microbiological Data (total plate count)

| Treatment | Temp | | Day 0 | Day 3 | Day 6 | Day 9 |
|---|---|---|---|---|---|---|
| Unwashed | 35 | whole | 1,504,804 | 6,372,267 | 5793268 | 3406778 |
| | | sliced | 156,446 | 4682156 | 3733859 | 12796706 |
| | 45 | whole | | 6,479,968 | | |
| | | sliced | | 8628519 | | |
| | 55 | whole | | 26,238,308 | | |
| | | sliced | | 53,091,451 | | |
| sulfite treated | 35 | whole | 299,999 | 3,849,234 | 20709887 | 31562526 |
| | | sliced | 178,805 | 12,344,021 | 31345339 | 383205051 |
| | 45 | whole | | 216,318,555 | | |
| | | sliced | | 69,673,049 | | |
| | 55 | whole | | 145,637,959 | | |
| | | sliced | | 381,362,639 | | |
| new wash | 35 | whole | 45,605 | 556,511 | 7029283 | 12035695 |
| | | sliced | 131,664 | 646,497 | 4064637 | 37247742 |
| | 45 | whole | | 14,644,553 | | |
| | | sliced | | 58,160,110 | | |
| | 55 | whole | | 44828967 | | |
| | | sliced | | 534,919,543 | | |

Total plate count = Average population (cfu/g) of 3 replicates
Temperature = degrees Fahrenheit For the all the following organoleptic data this key applies:

1=prefect condition, paper white, <10% opening on veils

2=few flaws in cap, slight yellowing, 10-30% veil opening

3=average condition, some yellow/brown spots, 30-50% veil opening

4=below average, last day on shelf, brown spots, 60-75% veil opening

5=not salable, multiple brown spots or decay, >75% veil opening

TABLE 2

Experiment 1: Organoleptic Data

| Treatment | Temp | Day | Overall appearance | | | visual whiteness | | | % veil opening | | |
|---|---|---|---|---|---|---|---|---|---|---|---|
| | | | 3 | 6 | 9 | 3 | 6 | 9 | 3 | 6 | 9 |
| Unwashed | 35 | whole | 3 | 5 | 5 | 4 | 5 | 5 | 3 | 3 | 4 |
| | | sliced | 3 | 5 | 5 | 4 | 4 | 5 | 2 | 5 | 5 |
| | 45 | whole | 4 | 4 | 5 | 4 | 4 | 5 | 3 | 4 | 5 |
| | | sliced | 5 | 5 | 5 | 5 | 5 | 5 | 5 | 5 | 5 |
| | 55 | whole | 3 | 5 | | 3 | 5 | | 3 | 5 | |
| | | sliced | 4 | 5 | | 4 | 5 | | 4 | 5 | |
| sulfite treated | 35 | whole | 3 | 4 | 5 | 3 | 4 | 5 | 1 | 4 | 5 |
| | | sliced | 3 | 4 | 5 | 3 | 4 | 5 | 2 | 4 | 5 |
| | 45 | whole | 3 | 5 | 5 | 3 | 5 | 5 | 3 | 5 | |
| | | sliced | 3 | 5 | 5 | 3 | 5 | 5 | 3 | 5 | |
| | 55 | whole | 4 | 5 | | 3 | 5 | | 4 | 5 | |
| | | sliced | 4 | 5 | | 4 | 5 | | 4 | 5 | |
| new wash | 35 | whole | 2 | 4 | 4 | 2 | 4 | 4+ | 1 | 3 | 5 |
| | | sliced | 2 | 4 | 4 | 2 | 4 | 4+ | 1 | 3 | 4 |
| | 45 | whole | 2 | 3 | 5 | 2 | 3 | 5 | 1 | 3 | 5 |
| | | sliced | 2 | 4 | 5 | 3 | 4 | 5 | 2 | 4 | 5 |
| | 55 | whole | 2 | 5 | | 2 | 5 | | 2 | 5 | |
| | | sliced | 4 | 5 | | 4 | 5 | | 3 | 5 | |

The effectiveness of the new wash process (the preferred embodiment) is highly evident in the whole product. Sliced product can be cross-contaminated when contacting slicing blades previously contaminated by other product. Both microbiological and organoleptic data indicates the advantage of the new was process, especially under stressful conditions of higher temperature; note, lower percentage veils open indicating slowed maturity, a whiter product indicating the effectiveness of the antibrowning step, and a decrease in the microbiological load (whole product, especially) manifesting the effectiveness of antimicrobial treatment.

Statistically, there is a significant difference between microbiological populations on day 0 unwashed, sulfite treated and new washed whole mushrooms. This indicates the positive antimicrobial effect of the disclosed treatment. There is not a statistically significant difference between and within groups of sliced mushrooms on day 0. As with the organoleptic data, this likely indicates cross contamination on slicing equipment, and does not impact the efficacy of the disclosed invention. On day 3, 35 degree storage, the difference between whole mushroom treatments again showed that the new wash resulted in a significant decline in microbial population as compared to unwashed, and sulfite washed. Again, populations on sliced mushrooms at 35 degrees were not significantly different. On day 6, the difference between treatments at 35 degrees (both whole and sliced) was not statistically significant.

EXAMPLE 2

Mushrooms were either 1) Mushrooms were washed with water (2-3 second drench with tap water) then processed through 2 consecutive dip tanks containing an aqueous solution of 500 ppm sodium metabisulfite (sulfite treated); or 2) Washed using the herein disclosed process (new wash) specifically as follows: Mushrooms were conveyed on a slotted conveyor belt and sprayed with tap water for seconds. They dropped into a series of two dip tanks containing 3% (w/v) sodium erythorbate, 0.15% (w/v) disodium EDTA, 0.15% (w/v) calcium chloride. Total residence time was 30 seconds. The whole mushrooms were then treated with 2 ppm ozone spray followed by 10 second exposure to ultraviolet lamp. Half of the mushroom were sliced and again exposed to 10 seconds of ultraviolet lamp. The mushrooms were packaged and stored at either 35, 45 or 55 degrees Fahrenheit. 35 degree F. stored samples were analyzed at day 0, 2, 6, and 9 and 14 for total aerobic plate count. Both 35 and 45 degree F. stored samples were analyzed on day 2, 6, 9 and 14 for organoleptic properties including degree of whiteness, amount of veil opening, and overall salability/ quality. Storage at 45 degrees Fahrenheit represent physiologically stressful conditions and will illustrate benefits of treatments to a greater extent than 35 degree F. storage.

Those categories for which a rating is not given, indicates a degradation of the product beyond the rating scale.

TABLE 3

Experiment 2 Microbiological Data (total plate count)

| Treatment | Temp | | 0 | 2 | 6 | 9 | 14 |
|---|---|---|---|---|---|---|---|
| sulfite treated | 35 | whole | 24,188 | 59,492 | 428,579 | 734,285 | 253,940,711 |
| | | sliced | 168,922 | 736,188 | 6,101,012 | 7,976,377 | 702,413,006 |
| new wash | 35 | whole | 4,864 | 20,433 | 35,969 | 275,377 | 19,143,778 |
| | | sliced | 121,663 | 136,975 | 472,770 | 432,999 | 46,576,133 |

Total plate count = Average population (cfu/g) of 3 replicates
Temperature = degrees Fahrenheit

TABLE 4

Experiment 2: Organoleptic Data

| Treatment | Temp | Day | Overall appearance | | | | Visual whiteness | | | | Veil opening | | | |
|---|---|---|---|---|---|---|---|---|---|---|---|---|---|---|
| | | | 2 | 6 | 9 | 14 | 2 | 6 | 9 | 14 | 2 | 6 | 9 | 14 |
| sulfite treated | 35 | whole | 3 | 3 | 4 | 5 | 3 | 3 | 4+ | 5 | 1 | 1 | 2 | 5 |
| | | sliced | 3 | 3 | 4 | 5+ | 3 | 3 | 4+ | 5+ | 1 | 2 | 2 | 5+ |
| | 45 | whole | 3 | 5 | 5+ | | 3 | 5 | 5+ | | 2 | 4 | 5 | |
| | | sliced | 3 | 5 | | | 3 | 5 | | | 2 | 5 | | |
| new wash | 35 | whole | 2 | 3 | 4 | 4.5 | 2 | 3 | 4 | 4.5 | 0 | 1 | 2 | 3 |
| | | sliced | 2 | 3 | 4 | 4.5 | 2 | 3 | 4 | 4.5 | 1 | 2 | 2 | 3 |
| | 45 | whole | 3 | 4 | 5 | | 3 | 4 | 5 | | 2 | 4 | 5 | 4 |
| | | sliced | 3 | 4+ | | | 3 | 4 | | | 2 | 4+ | | 4 |

Statistically, the microbial population on whole mushrooms treated with the new wash was significantly lower on day 0, 2 and 9 than the other two treatments. Sliced mushrooms treated with the new wash had significantly lower populations on day 0 and day 6. These results, when combined with the organoleptic results, again demonstrate the efficacy of the wash treatment

EXAMPLE 3

Mushrooms were either 1) untreated (unwashed), that is, left as picked; 2)sodium metabisulfite (sulfite treated) washed. Mushrooms were water rinsed with tap water for 5 seconds then processed through 2 consecutive dip tanks containing 500 ppm sodium metabisulfite; or 3)Washed using the herein disclosed process (new wash) specifically as follows: Mushrooms were conveyed on a slotted conveyor belt and sprayed with tap water for 2 seconds. They dropped into a series of two dip tanks containing 3% (w/v) sodium erythorbate, 0.3% (w/v) sodium chloride, 0.3% (w/v) calcium chloride. Total residence time was 30 seconds. In the third treatment (new wash 1) the whole mushrooms were then treated with 2 ppm ozone spray followed immediately by 10 second exposure to ultraviolet lamp. New wash 2 mushrooms were treated as described above but was treated only with ozone, no ultraviolet light. New wash 3 mushrooms were treated with 7 seconds of ultraviolet light, no ozone. New wash 4 mushrooms were treated with ozone and ultraviolet light simultaneously.

Mushrooms were analyzed for microbial load within 18 hours of processing. Total aerobic population was analyzed with a sensitivity of 1000 cfu/gram.

TABLE 5

Experiment 3 Microbiological Data (total plate count)

| Treatment | Total Plate Count Whole | Total Plate Count Sliced |
|---|---|---|
| Unwashed | 2,042,820 | 8,260,363 |
| Sulfite treated | 352,745 | 918,987 |
| new wash 1 | 310,641 | 870,994 |
| new wash 2 | 408,842 | 2,141,124 |
| new wash 3 | 1,101,684 | 511,278 |
| new wash 4 | 238,542 | 617,151 |

These microbiological results indicate that the simultaneous, or sequential application of ozone and ultraviolet light is superior to ultraviolet light alone. Moreover, data suggests the superiority of combined technologies over ozone alone. Again, the benefit of a wash process on bacterial contamination is reinforced by this data

TABLE 6

L-Value (whiteness)

| | 35 degrees F. | |
|---|---|---|
| Treatment | Day 1 | Day 5 |
| 1 | 88.7 ± 4.0 | 86.4 ± 4.6 |
| 2 | 90.3 ± 2.4 | 88.7 ± 2.9 |
| 3 | 88.8 ± 2.3 | 86.5 ± 2.5 |
| 4 | 89.1 ± 2.6 | 88.9 ± 2.1 |
| 5 | 90.0 ± 2.8 | 89.7 ± 2.3 |
| 6 | 90.6 ± 1.0 | 88.9 ± 2.2 |

TABLE 7 a value (red/blue)

| | 35 degrees F. | |
|---|---|---|
| Treatment | Day 1 | Day 5 |
| 1 | 10.6 ± 1.1 | 9.8 ± 1.5 |
| 2 | 9.8 ± 0.7 | 9.7 ± 0.9 |
| 3 | 10.5 ± 1.0 | 10.2 ± 0.7 |
| 4 | 10.2 ± 0.9 | 9.8 ± 0.8 |
| 5 | 10.1 ± 1.1 | 9.4 ± 0.6 |
| 6 | 9.6 ± 0.7 | 9.7 ± 0.8 |

TABLE 8 b value (yellow/brown)

| | 35 degrees F. | |
|---|---|---|
| Treatment | Day 1 | Day 5 |
| 1 | 5.7 ± 1.9 | 7.7 ± 2.0 |
| 2 | 5.7 ± 2.0 | 6.6 ± 1.9 |
| 3 | 6.3 ± 1.6 | 8.2 ± 1.9 |
| 4 | 5.7 ± 1.2 | 6.8 ± 0.9 |
| 5 | 5.6 ± 1.5 | 6.2 ± 1.3 |
| 6 | 5.4 ± 1.2 | 7.1 ± 1.7 |

For each of the above values, measurements were taken on 5 mushrooms per treatment, and 3 measurements per mushroom. Minolta calorimeter was used to measure Lab values. The whiteness data, L-values, given above indicate that the wash process results in slightly increased whiteness, and less variability within a package of mushrooms on day 0. This trend was exacerbated by day 5 storage at 35 degrees F. Sulfite treatment, a commonly acknowledged commercial standard in the industry and commonly known to bleach mushrooms, is no whiter than the new wash treatment. Further, the new wash treatment 4 (U.V. and ozone simultaneously), is less yellow/brown than sulfite treatment.

As can be easily understood from the foregoing, the basic concepts of the present invention may be embodied in a variety of ways. It involves both maintaining integrity of produce techniques as well as well as devices to accomplish the appropriate maintenance of produce. In this application, the systems for maintaining the integrity of produce are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims.

It should also be understood that a variety of chqnges may be made without departing from the essence of the invention. Such changes are also implicitly included in the description and its application to a variety of produce integrity maintenance systems. They still fall within the scope of this invention.

Further, each of the various elements of the invention and claims may also be achieved in a variety of manners. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "treatment" should be understood to encompass disclosure of the act of "treating"—whether explicitly discussed or not—and, conversely, were there effectively disclosure of the act of "treating", such a disclosure should be understood to encompass disclosure of a "treat" and even a "means for treating." Such changes and alternative terms are to be understood to be explicitly included in the description.

All patents, publications, or other references mentioned in this application for patent or listed in an attached information disclosure statement are hereby incorporated by reference. In addition, as to each term used it should be understood that unless its utilization in this application is inconsistent with such interpretation, common dictionary definitions should be understood as incorporated for each term and all definitions, alternative terms, and synonyms such as contained in the Random House Webster's Unabridged Dictionary, second edition are hereby incorporated by reference. Finally, as to all references listed or specifically mentioned, each is hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim at least: i) each of the produce integrity maintenance system devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the elements disclosed, and xi) each potentially dependent claim or concept as a dependency on each and every one of the independent claims or concepts presented. In this regard it should be understood that for practical reasons and so as to avoid adding potentially hundreds of claims, the applicant may eventually present claims with initial dependencies only. Support should be understood to exist to the degree required under new matter laws—including but not limited to European Patent Convention Article 123(2) and United States Patent Law 35 U.S.C. § 132 or other such laws—to permit the addition of any of the various dependencies or other elements presented under one independent claim or concept as dependencies or elements under any other independent claim or concept. Further, when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible.

In addition, the claims set forth later in this specification are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

We claim:

1. A method for maintaining the integrity of an item of mushroom produce comprising the steps of:
   providing at least one item of mushroom produce;
   accepting input of said at least one item of mushroom produce;
   conveying said at least one item of mushroom produce for at least one process;
   delicately removing macrodebris from said at least one item of mushroom produce through utilizing an application selected from a group consisting of misting said at least one item of mushroom produce and dipping said at least one item of mushroom produce;
   applying an antibrowning agent to said at least one item of mushroom produce;
   exposing said at least one item of mushroom produce and said antibrowning agent to ultraviolet light;
   applying a surface antimicrobial ozonated water treatment to the surface of said at least one item of mushroom produce for about 5 to 60 seconds in a manner to reduce microbial load on the surface of said at least one item of mushroom produce;
   drying said at least one item of mushroom produce; and
   maintaining the consumer integrity of said at least one item of mushroom produce to at least some degree.

2. A method for maintaining the integrity of an item of mushroom produce as described in claim 1 wherein said step of exposing said at least one item of mushroom produce and said antibrowning agent to ultraviolet light follows said step of applying an antibrowning agent to said at least one item of mushroom produce.

3. A method for maintaining the integrity of an item of mushroom produce as described in claim 1 wherein said step of exposing said at least one item of mushroom produce and said antibrowning agent to ultraviolet light comprises multiple exposures of said at least one item of mushroom produce and said antibrowning agent to ultraviolet light.

4. A method for maintaining the integrity of an item of mushroom produce as described in claim 1 wherein said step of providing at least one item of mushroom produce comprises the step of providing at least one item of white button mushroom produce.

5. A method for maintaining the integrity of an item of mushroom produce as described in claim 1 and further comprising the step of equally subjecting all surfaces of said at least one item of mushroom produce to said antibrowning agent and said ultraviolet light.

6. A method for maintaining the integrity of an item of mushroom produce as described in claim 1 and further comprising the step of subjecting at least part of a selected surface of said at least one item of mushroom produce to said antibrowning agent and said ultraviolet light.

7. A method for maintaining the integrity of an item of mushroom produce as described in claim 1 and further comprising the step of covering said at least one item of mushroom produce with an oxygen scavenging film.

8. A method for maintaining the integrity of an item of mushroom produce as described in claim 1 wherein said step of maintaining said consumer integrity of said at least one item of mushroom produce to at least some degree comprises the step of increasing a shelf life of said at least one item of mushroom produce.

9. A method for maintaining the integrity of an item of mushroom produce as described in claim 1 wherein said step of applying said surface antimicrobial ozonated water treatment comprises the step of applying about 0.5 to about 5 ppm of aqueous ozone to said at least one item of mushroom produce.

10. A method for maintaining the integrity of an item of mushroom produce as described in claim 1 and further comprising the step of applying said surface antimicrobial ozonated water treatment having a temperature of less than about 60° F.

11. A method for maintaining the integrity of an item of mushroom produce as described in claim 1 and further comprising the step of applying said surface antimicrobial ozonated water treatment having a temperature of less than about 40° F.

12. A method for maintaining the integrity of an item of mushroom produce as described in claim 1 wherein said step of applying said surface antimicrobial ozonated water treatment comprises the step of applying said surface antimicrobial ozonated water treatment having a pH between about pH 6 to about 8 to said surface of said at least one item of mushroom produce.

13. A method for maintaining the integrity of an item of mushroom produce as described in claim 1 wherein said step of applying said surface antimicrobial ozonated water treatment comprises the step of applying said surface antimicrobial ozonated water treatment having a pH of about 6.5 to said surface of said at least one item of mushroom produce.

14. A method for maintaining the integrity of an item of mushroom produce as described in claim 1 and further comprising the step of providing a pH of said surface antimicrobial ozonated water treatment which is about equal to a pH of tissue of said at least one item of mushroom produce.

15. A method for maintaining the integrity of an item of mushroom produce as described in claim 1 wherein said step of applying said surface antimicrobial ozonated water treatment to said surface of at least one item of mushroom produce comprises the step of exposing said at least one item of mushroom produce to said surface antimicrobial ozonated water treatment for about 20 seconds.

16. A method for maintaining the integrity of an item of mushroom produce as described in claim 1 wherein said step of exposing said at least one item of mushroom produce and said antibrowning agent to ultraviolet light occurs before said step of applying said surface antimicrobial ozonated water treatment to said surface of at least one item of mushroom produce.

17. A method for maintaining the integrity of an item of mushroom produce as described in claim 1 and further comprising the step of exposing said at least one item of mushroom produce to a second ultraviolet light wherein said step of exposing said at least one item of mushroom produce and said antibrowning agent to ultraviolet light occurs before said step of applying said surface antimicrobial ozonated water treatment to said surface of said at least one item of mushroom produce and said step of applying said surface antimicrobial ozonated water treatment to said surface of said at least one item of mushroom produce occurs before said step of exposing said at least one item of mushroom produce and said antibrowning agent to said second ultraviolet light.

18. A method for maintaining the integrity of an item of mushroom produce as described in claim 4 and further comprising the steps of:
applying a first surface antimicrobial ozonated water treatment to said surface of at least one item of mushroom produce;
applying a second surface antimicrobial ozonated water treatment to said surface of at least one item of mushroom produce;
exposing said at least one item of mushroom produce and said antibrowning agent to a second ultraviolet light,
wherein said step of exposing said at least one item of mushroom produce and said antibrowning agent to ultraviolet light occurs before said step of applying said first surface antimicrobial ozonated water treatment to said surface of at least one item of mushroom produce and said step of applying said first surface antimicrobial ozonated water treatment to said surface of at least one item of mushroom produce occurs before said step of applying said second surface antimicrobial ozonated water treatment to said surface of at least one item of mushroom produce and said step of applying said second surface antimicrobial ozonated water treatment to said surface of at least one item of mushroom produce occurs before said step of exposing said at least one item of mushroom produce and said antibrowning agent to said second ultraviolet light.

19. A method for maintaining the integrity of an item of mushroom produce as described in claim 1 wherein said step of applying said surface antimicrobial ozonated water treatment to said at least one item of mushroom produce occurs before said step of exposing said at least one item of mushroom produce and said antibrowning agent to ultraviolet light.

20. A method for maintaining the integrity of an item of mushroom produce as described in claim 1 and further comprising the step of selecting the application of said surface antimicrobial ozonated water treatment from the group consisting of dipping said at least one item of mushroom produce in said surface antimicrobial ozonated water treatment, drenching said at least one item of mushroom produce with said surface antimicrobial ozonated water treatment and spraying said at least one item of mushroom produce with said surface antimicrobial ozonated water treatment.

21. A method for maintaining the integrity of an item of mushroom produce as described in claim 1 and further comprising the step of applying said surface antimicrobial ozonated water treatment to at least part of said at least one item of produce as compared to at least another part of said at least one item of mushroom produce.

22. A method for maintaining the integrity of an item of mushroom produce as described in claim 1 and further comprising the step of equally applying said surface antimicrobial ozonated water treatment to the surface of at least one item of mushroom produce.

23. A method for maintaining the integrity of an item of mushroom produce as described in claim 22 wherein said step of equally applying said surface antimicrobial ozonated water treatment to the surface of at least one item of mushroom produce comprises the step of repositioning said at least one item of mushroom produce during said step of applying said surface antimicrobial ozonated water treatment to said surface of at least one item of mushroom produce.

24. A method for maintaining the integrity of an item of mushroom produce as described in claim 1 and further comprising the step of recycling water from said step of applying said surface antimicrobial ozonated water treatment to the surface of said at least one item of mushroom produce.

25. A method for maintaining the integrity of an item of mushroom produce as described in claim 24 wherein said step of recycling water from said step of applying said surface antimicrobial ozonated water treatment comprises the step of re-using said water for at least one more process.

26. A method for maintaining the integrity of an item of mushroom produce as described in claim 1 wherein said step of exposing said at least one item of mushroom produce and said antibrowning agent to ultraviolet light comprises the step of exposing said at least one item of mushroom produce and said antibrowning agent to ultraviolet light having at least three wavelengths.

27. A method for maintaining the integrity of an item of mushroom produce as described in claim 26 wherein said step of exposing said at least one item of mushroom produce to ultraviolet light having said at least three wavelengths comprises the step of exposing said at least one item of mushroom produce and said antibrowning agent to ultraviolet light having wavelengths of about 185 nm, about 189 nm, and about 253.7 nm.

28. A method for maintaining the integrity of an item of mushroom produce as described in claim 1 wherein said step of exposing said at least one item of mushroom produce and said antibrowning agent to ultraviolet light comprises the step of exposing said at least one item of mushroom produce and said antibrowning agent to ultraviolet light having about 1 inch to about 24 inches between said surface of said at least one item of mushroom produce and a standard ultraviolet source.

29. A method for maintaining the integrity of an item of mushroom produce as described in claim 1 wherein said step of exposing said at least one item of mushroom produce and said antibrowning agent to ultraviolet light comprises the step of exposing said at least one item of mushroom produce and said antibrowning agent to ultraviolet light having about 5 inches between said surface of said at least one item of mushroom produce and a standard ultraviolet source.

30. A method for maintaining the integrity of an item of mushroom produce as described in claim 1 wherein said step of exposing said at least one item of mushroom produce and said antibrowning agent to ultraviolet light comprises the step of exposing said at least one item of mushroom produce and said antibrowning agent to about 0.1 joules/cm$^2$.

31. A method for maintaining the integrity of an item of mushroom produce as described in claim 1 and further comprising the step of repositioning said at least one item of mushroom produce for said at least one process.

32. A method for maintaining the integrity of an item of mushroom produce as described in claim 1 wherein said step of providing at least one item of mushroom produce comprises produce selected from the group consisting of whole items of mushroom produce, sliced items of mushroom produce, and sectioned items of mushroom produce.

33. A method for maintaining the integrity of an item of mushroom produce as described in claim 1 wherein said step of removing macrodebris from said at least one item of mushroom produce comprises the step of removing growing media from said at least one item of mushroom produce.

34. A method for maintaining the integrity of an item of mushroom produce as described in claim 1 wherein said step of removing macrodebris from said at least one item of mushroom produce comprises the step of removing at least one fractured produce from at least one whole item of produce.

35. A method for maintaining the integrity of an item of mushroom produce as described in claim 1 wherein said step of removing macrodebris from said at least one item of mushroom produce comprises the steps of:
treating said at least one item of mushroom produce in conjunction with a sieve-type element; and
removing macrodebris from produce through apertures in said sieve-type element.

36. A method for maintaining the integrity of an item of mushroom produce as described in claim 1 and further comprising the step of recycling water from said at least one process.

37. A method for maintaining the integrity of an item of mushroom produce as described in claim 1 and further comprising the step of washing said at least one item of mushroom produce with a cleaning solution.

38. A method for maintaining the integrity of an item of mushroom produce as described in claim 37 wherein said step of washing said at least one item of mushroom produce with said cleaning solution occurs before said steps of applying said antibrowning agent to said at least one item of mushroom produce and said step of exposing said at least one item of mushroom produce and said antibrowning agent to ultraviolet light.

39. A method for maintaining the integrity of an item of mushroom produce as described in claim 37 wherein said step of washing said at least one item of mushroom produce with said cleaning solution comprises the step of washing said at least one item of mushroom produce with a pH neutral aqueous solution.

40. A method for maintaining the integrity of an item of mushroom produce as described in claim 39 wherein said step of washing said at least one item of mushroom produce with said pH neutral aqueous solution comprises the step of washing said at least one item of mushroom produce with said pH neutral aqueous solution of about pH 6.5 to about 7.5.

41. A method for maintaining the integrity of an item of mushroom produce as described in claim 37 wherein said step of step of washing said at least one item of mushroom produce with said cleaning solution comprises the step of washing said at least one item of mushroom produce with a surfactant.

42. A method for maintaining the integrity of an item of mushroom produce as described in claim 37 wherein said step of washing said at least one produce with said cleaning solution comprises the step of washing said at least one produce with an anti-foam agent.

43. A method for maintaining the integrity of an item of mushroom produce as described in claim 42 wherein said step of washing said at least one item of mushroom produce with said anti-foam agent comprises the step of washing said at least one item of mushroom produce with a food grade anti-foam agent having a concentration of around 5 ppm of said food grade anti-foam agent.

44. A method for maintaining the integrity of an item of mushroom produce as described in claim 37 wherein said step of washing said at least one produce with said cleaning solution comprises the step of washing said at least one produce with said cleaning solution for less than about 15 seconds.

45. A method for maintaining the integrity of an item of mushroom produce as described in claim 37 wherein said step of washing said at least one produce with said cleaning solution comprises the step of washing said at least one produce with said cleaning solution for less than about 4 seconds.

46. A method for maintaining the integrity of an item of mushroom produce as described in claim 37 and further comprising the step of selecting an application of said cleaning solution from the group consisting of spraying said cleaning solution on said at least one item of mushroom produce, misting said cleaning solution on said at least one item of mushroom produce, drenching said cleaning solution on said at least one item of mushroom produce, and immersing said cleaning solution on said at least one item of mushroom produce.

47. A method for maintaining the integrity of an item of mushroom produce as described in claim 37 and further comprising the step of recirculating filtered cleaning solution for at least one more process.

48. A method for maintaining the integrity of an item of mushroom produce as described in claim 47 wherein said step of recirculating filtered cleaning solution for said at least one more process comprises the step of re-utilizing said cleaning solution in rinsing said at least one item of mushroom produce.

49. A method for maintaining the integrity of an item of mushroom produce as described in claim 37 and further comprising the step of removing excess water from said at least one item of mushroom produce.

50. A method for maintaining the integrity of an item of mushroom produce as described in claim 1 and further comprising the step of applying an additional compound to said at least one item of mushroom produce selected from the group consisting of applying ascorbic acid, applying sodium chloride, applying citric acid, and applying cysteine HCL.

51. A method for maintaining the integrity of an item of mushroom produce as described in claim 1 and further comprising the step of applying antibrowning agent to said at least one item of mushroom produce for less than about 1.5 minutes.

52. A method for maintaining the integrity of an item of mushroom produce as described in claim 1 and further comprising the step of applying antibrowning agent to said at least one item of mushroom produce for less than about 30 seconds and greater than about 2 seconds.

53. A method for maintaining the integrity of an item of mushroom produce as described in claim 1 wherein said step of applying antibrowning agent to said at least one item of mushroom produce is followed by the step of rinsing said at least one item of mushroom produce with water.

54. A method for maintaining the integrity of an item of mushroom produce as described in claim 53 wherein said step of rinsing said at least one item of mushroom produce with said water is followed by the step of drying said at least one item of mushroom produce.

55. A method for maintaining the integrity of an item of mushroom produce as described in claim 54 wherein said step of drying said at least one item of mushroom produce comprises the step of removing at least about 80% of surface water from said at least one item of mushroom produce.

56. A method for maintaining the integrity of an item of mushroom produce as described in claim 54 wherein said step of drying said at least one item of mushroom produce comprises the step of removing about 90% to about 95% of surface water from said at least one item of mushroom produce.

57. A method for maintaining the integrity of an item of mushroom produce as described in claim 54 wherein said step of drying said at least one item of mushroom produce is followed by a second step of rinsing said at least one item of mushroom produce with said water.

58. A method for maintaining the integrity of an item of mushroom produce as described in claim 1 wherein said step of maintaining said consumer integrity of said at least one item of mushroom produce to at least some degree comprises the step of inhibiting browning enzyme on said at least one item of mushroom produce.

59. A system method for maintaining the integrity of an item of mushroom produce as described in claim 1 wherein said step of maintaining said consumer integrity of said at least one item of mushroom produce to at least some degree comprises the step reducing residual chemical on a surface of said at least one item of mushroom produce.

* * * * *